United States Patent [19]

Lee et al.

[11] Patent Number: 4,584,337

[45] Date of Patent: Apr. 22, 1986

[54] AQUEOUS EMULSIONS CONTAINING HYDROPHILIC SILICONE-ORGANIC COPOLYMERS

[75] Inventors: Chi-long Lee, Midland, Mich.; Wen-Bin Shyu, Chagrin Falls, Ohio

[73] Assignee: Dow Corning Corporation, Midland, Mich.

[21] Appl. No.: 683,303

[22] Filed: Dec. 18, 1984

[51] Int. Cl.$^4$ .............................................. C08L 51/08
[52] U.S. Cl. .................................... 524/500; 424/78; 524/457; 524/547; 524/806; 524/866; 525/479; 528/26; 528/28
[58] Field of Search ............... 524/806, 457, 866, 500, 524/547; 525/479; 528/26, 28; 424/78

[56] References Cited

U.S. PATENT DOCUMENTS

| | | | |
|---|---|---|---|
| 3,484,394 | 12/1969 | Holdstock | 260/3 |
| 4,136,250 | 1/1979 | Mueller et al. | 528/29 |
| 4,235,985 | 11/1980 | Tanaka et al. | 526/279 |
| 4,260,725 | 4/1981 | Keogh et al. | 526/279 |
| 4,309,529 | 1/1982 | Wendling | 528/289 |
| 4,320,221 | 3/1982 | Hoffman | 528/69 |
| 4,369,300 | 1/1983 | Carter et al. | 528/28 |
| 4,486,577 | 12/1984 | Mueller et al. | 525/474 |
| 4,496,210 | 1/1985 | Ansel et al. | 350/96.3 |

FOREIGN PATENT DOCUMENTS

| | | |
|---|---|---|
| 842947 | 5/1970 | Canada . |
| 108886 | 5/1984 | European Pat. Off. . |
| 127321 | 5/1984 | European Pat. Off. . |

*Primary Examiner*—Wilbert J. Briggs, Sr.
*Attorney, Agent, or Firm*—Richard E. Rakoczy

[57] ABSTRACT

This present invention provides aqueous emulsions which are capable of depositing coatings and membranes of hydrophilic, water-absorbing silicone-organic polymer elastomers. The elastomers are free radical polymerized copolymers of (A) from 50 to 95 parts by weight of block copolymers containing polydiorganosiloxane segments and polyalkyleneoxy segments which block copolymers contain terminal aliphatically unsaturated groups such as those derived from the reaction of isocyanatoethyl methacrylate with terminal free hydroxyl groups present on the polyalkyleneoxy segments and (B) from 5 to 50 parts by weight of at least one substantially water insoluble aliphatically unsaturated organic monomer which is compatible with (A) such as methyl methacrylate. The aqueous emulsions are useful for forming coatings and membranes of the above elastomers and also provide a vehicle for the deposition of coatings of such elastomers which are capable of controllably releasing bioactive agents such as insecticides or herbicides which are dispersed within the elastomer film deposited from the aqueous emulsion.

12 Claims, No Drawings

AQUEOUS EMULSIONS CONTAINING HYDROPHILIC SILICONE-ORGANIC COPOLYMERS

BACKGROUND OF THE INVENTION

This invention relates to aqueous emulsions which contain hydrophilic, water-absorbing silicone-organic copolymers formed via free-radical polymerization. The emulsions are useful as vehicles to provide coatings on substrates such as fabrics and to provide gas and vapor permeable membranes.

Polydiorganosiloxane elastomers such as those which are predominantly polydimethylsiloxanes typically exhibit high permeability to various types of gases as compared with organic elastomers. Polydimethylsiloxane elastomers generally possess hydrophobic surfaces (i.e., water-in-air contact angles of greater than about 80° at 25° C. and more typically in the range of 95°–110°) due to the hydrophobic character of the polydimethylsiloxane chains forming the elastomer. As a result of their hydrophobic character, such elastomers tend to permit non-polar fluids and compounds to pass more readily through the elastomer than polar fluids such as water. It would be desirable to obtain an elastomer which possessed some of the high permeability characteristics of silicone elastomers, but which is hydrophilic and water-absorbing in nature, so as to more readily allow polar materials such as water, alcohols and polar bioactive agents such as insecticides or herbicides to pass through the elastomer. The hydrophilic character such as water-in-air contact angle and water absorbancy should be modifiable so as to enable one to adjust the rate at which a particular compound will permeate through the elastomer. If the hydrophilic, water-absorbing elastomer is to be used as a membrane for fluid separation, the elastomer should retain as much as possible of its original unhydrated physical properties such as tensile strength, elongation and tear strength after being hydrated and allowed to absorb water. An aqueous emulsion would provide a convenient method to apply a coating of such an elastomer to a substrate or to form a membrane.

Attempts to provide such elastomers have been made in the past, particularly in the field of eye contact lenses where an oxygen permeable, soft, hydrophilic elastomeric material is desirable. U.S. Pat. No. 4,136,250 to Mueller, et al. (issued 1/23/79) and hereby incorporated by reference provides a water-insoluble hydrophilic gel comprising about 20 to 90% by weight of (1) a hydrophilic (a) polymer of identical or different water-soluble monoolefinic monomers or (b) copolymer of said water-soluble monomers with 1 to 80% (of total monomers) of water insoluble, identical or different monoolefinic monomers; ingredient (1) is cross-linked with (2) about 10 to 80% by weight of a terminal polyolefinic siloxane macromer having a molecular weight of from about 400 to about 8500 to form a gel. Unlike the curable composition and hydrophilic elastomers of the present invention, Mueller, et al. teach that the siloxane macromer is the hydrophobic portion of the gel product and provides flexible cross-links and improved oxygen permeability. A water soluble monoolefinic monomer is required to be present as at least 20% by weight of the total monoolefinic monomers used to form the Mueller, et al. hydrogel. The Mueller, et al. patent mentions that such hydrogels can be polymerized in water. As will be described, we have discovered that the polysiloxane component of certain compositions can act as the hydrophilic portion within certain limits and have therefore found that substantially water insoluble aliphatically unsaturated monomers can be used to the exclusion of water soluble monoolefinic monomers to obtain hydrophilic, water-absorbing silicone elastomers which are oxygen permeable.

U.S. Pat. No. 4,235,985 to Tanaka, et al. (issued 11/25/80) teaches copolymers for contact lenses which are a copolymer of a organosiloxane monomer which contains a pendant hydroxyl radical for hydrophilicity and may optionally contain a polyether group (to improve the hydrophilicity of the copolymer) and a hydrophobic methacrylic acid alkyl ester. The copolymer is said to be hydrophilic, but is hard and is substantially non-water absorptive unlike the water-absorbing elastomers of the present invention. The organosiloxane monomer is employed to provide both oxygen permeability and hydrophilicity, but differs in structure from those employed in the present invention.

U.S. Pat. No. 4,260,725 to Keogh, et al. (issued 4/7/81) teaches a water-absorbing, soft, hydrophilic, flexible contact lens which is oxygen permeable. It teaches a copolymer of organic monomers which may or may not have hydrophilic groups such as hydroxyl groups present therein with a polysiloxane which is alpha, omega-terminally bonded through divalent hydrocarbon groups to polymerizably activated unsaturated groups and which polysiloxane has hydrophilic sidechains. Keogh, et al. fails to teach the polysiloxanes employed in the present invention. When polyether sidechains are used by Keogh, et al., they prefer methoxy end-capped polyether sidechains. This differs from the aliphatically unsaturated terminal groups employed in the present invention which enable the entire polysiloxane block copolymer to form the elastomer and thereby contribute to the retention of physical properties after absorbing water. Furthermore, Keogh, et al. make no distinction between the use of water soluble monomers such as 2-hydroxyethylmethacrylate versus substantially water insoluble organic comonomers such as methyl methacrylate in their compositions while the present invention employs substantially water insoluble organic monomers. These latter monomers are employed in the present invention to obtain cured elastomers with desirable physical strength and resistance to tearing after absorption of water.

Siloxane-acrylate copolymers and aqueous emulsions thereof useful as part of a coating composition are taught in Canadian Pat. No. 842,947 (issued 5/26/1970) to Thomas. The Thomas patent fails to teach hydrophilic, water-absorbing elastomers of the present invention.

SUMMARY OF THE INVENTION

It is one object of this invention to provide an aqueous emulsion containing a hydrophilic (i.e., water-in-air contact angle of no greater than 80° at 25° C. after hydration after being cured against a chromed steel substrate) silicone-organic copolymer which is capable of absorbing at least 3% by weight of water based upon the total dry weight of the elastomer. The aqueous emulsion comprises a copolymer which is the free radical polymerization product of from 50 to 95 parts by weight of a polydiorganosiloxane polyether block copolymers with from 5 to 50 parts by weight of one or more substantially water insoluble aliphatically unsaturated organic monomers. The block copolymer portion provides gas permeability, flexibility and hydrophilicity while the organic portion derived from organic unsaturated monomers provides improved physical properties before and after hydration. When polyether blocks are pendant from a silicon atom present in the polydiorganosiloxane segment of the block copolymer, the terminal end is capped with an aliphatically unsaturated radical for copolymerization with the organic monomer. This results in a copolymer wherein all of the hydrophilic polyether segments are tied into the copolymer network, thus contributing to the elastomeric properties of the copolymer in addition to serving to render the copolymer hydrophilic and water absorbing.

It is another object of this invention to provide an aqueous emulsion comprising a hydrophilic, water absorbing silicone-organic copolymer elastomer which is permeable and useful as a membrane for gas and fluid separations. It is also an object of this invention to provide an aqueous emulsion containing hydrophilic elastomers useful as coatings which are capable of releasing materials such as bioactive agents (e.g., insecticides and herbicides) at a controlled rate when the agents are incorporated into the emulsion prior to coating on a substrate. The release rate can be controlled by the choice of polysiloxane and polyether segments to vary the hydrophilic character of the copolymer elastomer. Aqueous emulsions provide a convenient vehicle for providing such membranes and coatings and avoid the need to use organic solvents which may create possible air pollution problems and may also adversely affect substrates, particularly living substrates such as leaves of plants, upon being coated.

DETAILED DESCRIPTION OF THE INVENTION

These and other objects of the present invention are provided by an aqueous emulsion containing a hydrophilic water-absorbing, silicone-organic copolymer elastomer consisting essentially of the product obtained upon reacting (A) from 50 to 95 parts by weight of a block copolymer of the formula

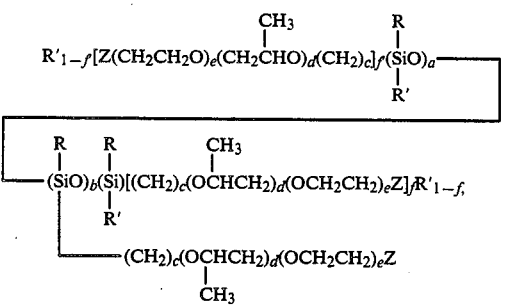

wherein
a is an integer of from 4 to 49, inclusive,
b is an integer of from 0 to 15, inclusive,
c is an integer having a value of from 2 to 4, inclusive,
d is an integer of from 0 to 25, inclusive,
e is an integer of from 5 to 50 inclusive
d+e is no greater than 50 and e is greater than or equal to d,
f is 0 or 1,
f' is 0 or 1,
f+f'+b is at least 2, R is a monovalent hydrocarbon or halohydrocarbon radical of from 1 to 6 inclusive carbon atoms which is free of aliphatic unsaturation,
R' is a methyl or a phenyl radical,
Z is a monovalent radical selected from the group consisting of $CH_2=CR''COOR'''NHCOO-$, and $CH_2=CR''COO-$,
R'' is an alkyl radical of from 1 to 4 inclusive carbon atoms or hydrogen, and
R''' is a divalent hydrocarbon radical of from 1 to 6 inclusive carbon atoms, and (B) from 5 to 50 parts by weight of at least one substantially water insoluble aliphatically unsaturated organic monomer which is compatible with said (A), said reaction being conducted under free radical polymerization conditions in the presence of water and an effective amount of a surfactant and wherein the dry elastomer obtained upon removal of the water is hydrophilic and capable of absorbing at least 3% by weight of water based upon the total weight of the dry elastomer.

The block copolymers employed in the present invention are preferably produced by reacting silicone polyether block copolymer prepolymers such as those of the formula

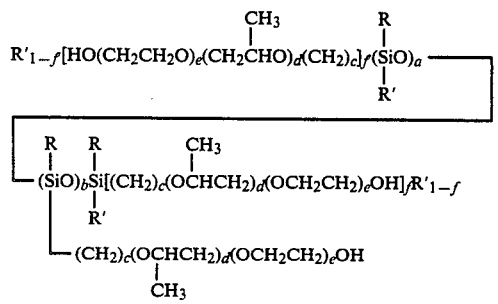

with aliphatically unsaturated compounds of the formula $CH_2=CR''COOR'''NCO$, or $CH_2=CR''COX$ to produce a block copolymer with the aforementioned aliphatically unsaturated compounds to produce a block copolymer wherein X is a hydrolyzable radical, preferably a chlorine radical. R'' can be methyl, ethyl, propyl, butyl or hydrogen and is preferably a methyl radical. Examples of aliphatically unsaturated compounds useful for reaction with the prepolymers are isocyanatoethyl methacrylate ($CH_2=C(CH_3)COO(CH_2)_2NCO$), isocyanatoethyl acrylate, methacryloyl chloride and acryloyl chloride. The isocyanate compounds are preferred since they provide a one step addition to the prepolymers under mild reaction conditions in the presence of a catalyst such as an organotin catalyst without generating by-products. 0.02% of dibutyltin dilaurate based upon the total amount of block copolymer prepolymer and isocyanate compound was found to work well with the above block copolymer prepolymers and isocyanatoethyl methacrylate. Most preferred is isocyanotoethyl methacrylate.

The prepolymers themselves are well known in the art as exemplified by U.S. Pat. Nos. 2,868,824 (Haluska, 1/13/1959); Re. 25,727 (Haluska, reissued 2/9/1965); 3,246,048 (Haluska, issued 4/12/1966); 3,560,544 (Haluska, issued 2/2/1971) and 3,957,843 (Bennett, issued 5/18/76) which are hereby incorporated by reference to teach prepolymers useful in preparing compositions of the present invention. For example, prepolymers for preparing the block copolymers are taught in U.S. Pat. No. Re. 25,727 and a linear dimethylsiloxane prepolymer containing two terminal polyethyleneoxide segments with terminal hydroxyl groups is commercially available. It is well known that block copolymers are typically a mixture of block copolymers of varying chain lengths having the previously described structure and the overall block copolymer composition is typically described as one wherein the average chain length of segments such as polyethyleneoxy units in the block copolymer composition is referred to by an integer such as "e is an integer of from 5 to 50" in the foregoing formula. The block copolymers of the present invention also contain substituted siloxy units (designated by the subscripts "a" and "b") which may be in the form of discrete blocks of, e.g., several (RR'SiO) units or may contain (RR'SiO) units interspersed with

units along the same linear polysiloxane chain.

As can be seen from the foregoing formulas, each R can be a hydrocarbon or a halohydrocarbon radical of from 1 to 6 inclusive carbon atoms which is free of aliphatic unsaturation such as methyl, ethyl, propyl, hexyl, cyclohexyl, chloromethyl, 3,3,3-trifluoropropyl or 1,1,1-trifluorohexyl radicals. Preferably R is selected from the group consisting of methyl, phenyl and 3,3,3-trifluoropropyl radicals. For highest permeability to gases such as oxygen, R and R' are most preferably methyl radicals.

To obtain a hydrophilic, water-absorbing, silicone-organic copolymer elastomer, the block copolymer must contain a sufficient amount of hydrophilic ether (alkyleneoxy) units to overcome the hydrophobic character contributed by the polysiloxane segments and by the organic polymer segments derived from the unsaturated monomers. A polysiloxane segment consisting of about 50 siloxy units which do not contain hydrophilic polyether segments is about the maximum which can be present and still obtain a hydrophilic surface having a water-in-air contact angle of no greater than about 80° at 25° C. when molded against chromed steel. This is particularly true when the block copolymer contains only two terminal polyether chains which is a preferred block copolymer (i.e., b=0). To obtain the best elastomeric properties, it is preferred that a block copolymer be employed wherein a is an integer of from 8 to 14 inclusive, c is 3 or 4, and e is an integer of from 10 to 15 inclusive. Since the ethyleneoxy —OCH$_2$CH$_2$— unit is more hydrophilic than the propyleneoxy

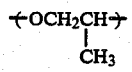

unit, the ratio of these units in the chain can be varied to modify the hydrophilicity and water absorption of the elastomer. If more than one half of the alkyleneoxy units present in the polyether segment are propyleneoxy units, the hydrophilicity of the elastomer may be compromised. For this reason, it is best that d be no greater than 25 and that the value of e be greater than or equal to d. Preferably, d=0 and the hydrophilicity and water absorption of the elastomer is varied by controlling the number and ratio of ethyleneoxy units to RR'SiO units in the polydiorganosiloxane segments. The polyether segments should not consist of more than 50 alkyleneoxy units, (i.e., the sum of d+e should be no greater than 50).

The permeability of the elastomer can also be controlled by varying the number and ratio of alkyleneoxy units to RR'SiO units. Block copolymers wherein b has a value of greater than 2 will tend to form more tightly cross-linked, less elastomeric copolymers than block copolymers wherein f+f'+b=2. It is best to minimize the amount of block copolymers wherein f+f'+b is greater than 2 in the composition to obtain the best elastomeric properties, particularly elongation values. The gas permeability of the cured elastomer begins to rapidly decrease for a given ratio of block copolymer to organic monomer as the siloxane content of the block copolymer content is decreased. 50 parts of block copolymer per 100 parts total block copolymer and organic monomer appears to be about the minimum necessary to retain a reasonable amount of gas permeability. When the block copolymer content of the elastomer is increased to about 95 parts, the physical properties of the cured elastomer tend to become poor. The water absorption of the elastomer should be at least about 3% by weight of water based upon the total weight of the dry cured elastomer before exposure to water. The water absorption of the cured elastomers will be dependent upon the polyalkyleneoxy content of the block copolymer. An increase in polyalkyleneoxy content of the block copolymer will generally increase the water absorption of the cured elastomer for a given ratio of block copolymer and organic monomer.

The block copolymers are copolymerized with from 5 to 50 parts by weight of at least one substantially water insoluble aliphatically unsaturated organic monomer which is compatible with the block copolymer. The term "compatible" is intended to mean that the block copolymer and organic monomer are sufficiently miscible and free radical polymerizable with each other that they are capable of forming a substantially cross-linked copolymer rather than being substantially a mixture of two homopolymers. A copolymer provides better physical properties. By "substantially water insoluble", it is meant that the monomer does not contain free hydroxyl radicals, polyalkyleneoxy radicals, carboxyl radicals, amine radicals or other radicals which by themselves or as salts render the monomer water soluble. Examples of water soluble monomers are 2-hydroxyethylmethacrylate and N-vinyl pyrrolidone. Examples of monomers which are substantially water insoluble include the hydrocarbon esters of acrylic and methacrylate acid such as methyl acrylate, methyl methacrylate, ethyl acrylate, butyl acrylate and cyclohexyl methacrylate, styrene, alphamethylstyrene, para-methylstyrene, vinyl acetate, vinyl propionate, allyl ether, and acrylonitrile. Preferably, such monomers are of the formula

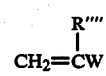

wherein W is selected from the group consisting of —COOR'''', —OOCCH$_3$ and —C$_6$H$_5$ wherein R'''' is an alkyl radical of from 1 to 6 inclusive carbon atoms such as methyl methacrylate, methyl acrylate, vinyl acetate and styrene. More preferably, the monomers are methyl methyacrylate, styrene or mixtures of both. Methyl methacrylate is most preferred. When higher tensile strength and tear resistant hydrophilic elastomers are desired such as for use as for example, membranes, it is preferable that from 30 to 50 parts by weight of the total weight of block copolymers and substantially water insoluble aliphatically unsaturated organic monomers present in the composition be such organic monomers.

Further details concerning the types of cured elastomers which can be prepared and their properties is contained in our copending U.S. patent application Ser. No. 683,308 entitled "Hydrophilic Silicone-Organic Copolymer Elastomers" filed concurrently herewith and assigned to the same assignee as is the present invention and that Application is hereby incorporated by reference.

In preparing the aqueous emulsions of the present invention, it was found that the use of a surfactant was necessary to produce a stable emulsion. Examples of useful surfactants are those which have been used in the past to produce emulsions of silicone materials such as anionic surfactants such as sulfates, alkyl sufonic acids and their salts, long chain carboxylic acids and their salts, and aralkyl sulfonic acids and their salts. Specific examples of such anionic surfactants are those such as sodium lauryl sulfate, sodium dodecylbenzene sulfonate, and sodium dodecyl sulphate. Other surfactants such as nonionic surfactants may also be useful, preferably, anionic surfactants are employed. The amount of surfactant to be employed can be determined in accordance with well known practices by observing the particle size and stability of the resulting emulsion. A level of 5% of sodium lauryl sulfate solids based upon the total weight of block copolymers and unsaturated organic monomer was found to produce reasonably stable emulsions having a non-volatile solids content of about 20% as will be demonstrated in the following Examples.

The stability of the emulsion and the size of dispersed phase also depend on the amount of surfactant used. The more the surfactant used, the better the stability and the smaller the dispersed phase size. The amount of water to be employed in making the emulsions will be dictated by the non-volatile solids content, viscosity and rheology of the emulsion device and also by the end use of the emulsion. For a given formulation, it is generally expected that emulsions having higher nonvolatile solids content would have larger particle sizes, higher viscosities and less stability than those having a lower nonvolatile solids content. Emulsions having a solids content of about 15–20% were found to be stable at room temperature for several months at room temperature as will be shown in the following Examples. It was also found that the use of lesser amounts of water in the formulation resulted in emulsions which were thixotropic and such emulsions retained their thixotropy even after additional water was added to the emulsion. Thixotropic emulsions could be useful where substrates such as plant stems and leaves are to be coated with emulsions containing bioactive agents. Non-thixotropic, lower viscosity emulsions obtained when a sufficient amount of water was initially present to result in a non-volatile solids content of about 15–18% could be useful where thin coatings or membranes of the cured elastomers are to be deposited on substrates such as a fabric material.

The aqueous emulsions of the present invention can be prepared by thoroughly mixing the water and surfactant together. If the copolymer is to be formed via a free radical polymerization method involving an ionizing radiation source such as ultraviolet radiation, or electron beam irradiation, a mixture of the block copolymer and unsaturated monomer can be added with vigorous stirring to the water/surfactant mixture accompanied by an inert gas blanket (e.g., nitrogen atmosphere). The mixture is then vigorously stirred for about one half hour. If ultraviolet radiation is employed, it can be desirable to add an effective amount of a photoinitiator such as benzophenone with or without a promoter such as an amine such as dimethylaniline can be added to the vigorously stirring mixture. The stirring mixture can then be exposed to the ionizing radiation source for a sufficient amount of time to obtain substantially complete reaction. Completion of the reaction can be monitored in the usual manner by the increase in non-volatile solids of the contents of the mixture with time.

Free radical polymerization of the block copolymer and unsaturated organic monomer can also be accomplished by the addition of 0.1 to 10 parts by weight per 100 parts by weight of total block copolymer and unsaturated organic monomer of an organic peroxide initiator to the block copolymer/unsaturated organic monomer mixture or by the addition of a like amount of an inorganic peroxide initiator or a redox initiator system to the water/surfactant mixture prior to the addition of the block copolymer/unsaturated organic monomer mixture. The water/surfactant mixture is typically preheated to a temperature consistent with the half-life of the initiator employed and thereafter the block copolymer/unsaturated organic monomer mixture is added over a period of time selected to minimize an exothermic rise in temperature. The mixture is then maintained at a temperature less than that of the boiling point of water until the copolymerization reaction is substantially complete. An initiator system such as a redox initiator system capable of causing copolymerization at room temperature is preferred when small particle size emulsions are desired.

Examples of useful organic peroxide free radical initiators are those such as tert-butyl peroxy-2-ethylhexanoate (also known as "t-butyl peroctoate"), 2,5-bis-(t-butylperoxy)-2,5-dimethyl hexane, benzoyl peroxide, methyl ethyl ketone peroxide and azo compounds such as 2,2-azo-bis-isobutyronitrile and 2,2′-azo-bis-(2,4-dimethylvaleronitrile). Examples of inorganic peroxides are those such as ammonium persulfate, hydrogen peroxide, potassium persulfate. Examples of redox initiators are a combination of ammonium persulfate and ferrous sulfate, hydrogen peroxide and ferrous salts, and cumene hydroperoxide and ferrous salts. Water soluble peroxides are preferred.

The term "consisting essentially of" as used in this Specification and the accompanying claims is intended to mean that the combination of block copolymers and substantially water insoluble organic polymers to provide hydrophilic, water-absorbing, silicone-organic copolymer elastomers in aqueous emulsion forms the basis for the present invention. Other ingredients which do not substantially change the emulsion or the elastomers obtained therefrom may also be included as follows.

To improve the coalescence of the particles of hydrophilic cured elastomers into an even film, it may also be desirable to include small amounts of well-known coalescing agents such as diglycols such as ethylene glycol and propylene glycol or glycol ethers such as ethylene glycol butyl ether before or after the copolymerization of the block copolymer and unsaturated organic monomer. Details concerning the addition of such agents as well as other ingredients which do not substantially change the stability of the emulsions or the hydrophilic, water absorbing character of the elastomers contained therein such as thickeners, silica and other fillers, antioxidants, preservatives, pigments, dyes, colorants and the like.

Because the permeability and the water absorption of the cured elastomers deposited from the aqueous emulsions of the present invention can be varied, the aqueous emulsions of the present invention are especially useful for forming coatings or membranes of hydrophilic silicone-organic copolymer elastomers on substrates such as fabrics to provide gas permeable coatings. Such coated fabrics or membranes can be formed by alternately depositing the emulsion on a substrate and drying the emulsion until a sufficient coating or membrane thickness has been obtained. The aqueous emulsions of the present invention provide a convenient vehicle whereby bioactive agents such as insecticides, larvicides, acaricides and herbicides or fertilizers can be dispersed into the emulsion. That emulsion would then be used to provide a coating of hydrophilic elastomer containing such agents for use on plants and other substrates. Because one of the cured elastomer formulations exhibited reactions in tissue culture testing thought to be due to unreacted components present in the block copolymer, appropriate safety and efficacy testing should be undertaken before employing these emulsions and elastomers for uses involving contact with animals and humans.

The permeability of the elastomer is selected relative to the agent such that the agent is released over a period of time which is dependent upon the composition of the elastomer.

The advancing water-in-air contact angle used to determine the hydrophilicity of the elastomer can be measured using a sessile drop method at room temperature (about 21°±2° C.) on dry (unhydrated) samples of the elastomer using a distilled water drop. To measure the water contact angle, the aqueous emulsion can be coated on a chrome-plated steel substrate and dried. The film is lifted and the surface dried against the chrome-plated steel is washed with ethanol and dried to remove any low molecular weight components which might have risen to the surface when the film was dried on the steel substrate. The drop of water is then applied to the surface of the elastomer film which faced the steel substrate and the measurement of the water-in-air contact angle is completed within about 2-6 minutes from the application of the water drop to the elastomer film. The NRL Contact Angle Goniometer, Model No. A-100 which is a product of Rame-Hart, Inc., Mountain Lake, N.J. is an example of an instrument which can be used to measure the water-in-air contact angle.

The percent water absorption of a dry film of a hydrophilic elastomer obtained from the aqueous emulsions of the present invention can be measured as follows. A dry membrane obtained from the aqueous emulsion is weighed and immersed in distilled water for 3-5 days at room temperature. After immersion, the membrane is removed from the water, blotted lightly and re-weighed. The percent water absorption is recorded as $(W_H - W_U) \times 100 \div W_U =$ percent water absorption where $W_H$ is the weight of the slab after hydration and $W_U$ is the dry (unhydrated) weight.

The following Examples are illustrative only and should not be construed as limiting the invention which is properly delineated in the appended claims.

EXAMPLE 1

This example describes the typical procedure employed to prepare the mixture of block copolymer and unsaturated organic monomer which was used to prepare the aqueous emulsions described in the following examples. The silicone polyether block copolymer prepolymer ("BCP-1") was predominantly composed of block copolymers of the formula

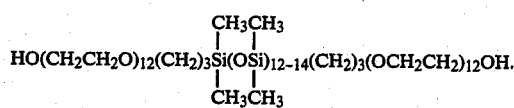

A stoichiometric amount plus 5% (15.5 parts by weight) of isocyanatoethyl methacrylate ("IEM") based upon the moles of hydroxyl radicals present in the BCP-1 (based upon the measured hydroxyl content) was added to 100 parts by weight of BCP-1 at room temperature along with 0.023 parts by weight (0.02% based upon the total weight of BCP-1 and IEM) of dibutyltin dilaurate to promote the addition of the isocyanate groups of the isocyanatoethyl methacrylate to the terminal free hydroxyl groups present in the polyether segment of the BCP-1. The mixture was stirred without heating for at least ten minutes while the temperature of the mixture was kept below 40° C. (the reaction is rapid and exothermic). This mixture containing the block copolymer was allowed to cool to room temperature and 77 parts by weight of methyl methacrylate monomer ("MMA") was stirred into the block copolymer mixture to obtain a material which is hereinafter referred to as "Reaction Mixture A". Reaction Mixture A contained 40% by weight of MMA and 60% by weight of the block copolymer.

EXAMPLE 2

This Example demonstrates the use of ultraviolet light to produce an aqueous emulsion of the present invention. The following composition was used to produce an aqueous emulsion: 100 grams(g) Reaction Mixture A, 235 g distilled water, 17 g sodium lauryl sulfate (30% active) and 0.5 g benzophenone.

The emulsion was prepared by blending the benzophenone photoinitiator with the Reaction Mixture A. The Reaction Mixture A containing the benzophenone was slowly added to a vigorously stirring mixture of the distilled water and the sodium lauryl sulfate. The stirring mixture was kept under a nitrogen gas blanket to eliminate oxygen from the mixture. After the addition was complete, the mixture had a milky appearance and appeared to be a stable emulsion. The mixture was placed in a small quartz vial and irradiated to cure the Reaction Mixture A. The vial was taped to the outside of the ultraviolet radiation source to accomplish irradiation. No additional heating of the mixture was carried out during the irradiation process. The Reaction Mixture A was not stirred during the irradiation process. The calculated non-volatile solids content of the emulsion assuming 100% reaction was 29.96%. After 60 minutes irradiation time, the measured solids content was 29.23% or 97.6% conversion. The ultraviolet radiation source was switched off after 60 minutes since the copolymerization was deemed to be substantially complete. An aqueous emulsion containing a hydrophilic, water absorbing silicone elastomer was thus produced.

The ultraviolet radiation source employed was an Ace-Hanovia 1 liter Photochemical Reactor No. 6533, 100 watt medium pressure Mercury Immersion Lamp commercially available from Hanovia Lamp Division, Conrad-Hanovia, Inc., Newark, N.J. 07105.

EXAMPLE 3

This Example demonstrates the use of an inorganic peroxide as a free radical initiator to produce aqueous emulsions of the present invention. A three-necked flask fitted with a nitrogen gas sponge tube, a mechanical stirring paddle, a thermometer and an additional funnel was filled with 235 g distilled water, 17 g sodium lauryl sulfate (30% active) and 0.25 g ammonium persulfate. The stirrer was started and the mixture was purged with nitrogen gas. The mixture in the flask was heated to 65° C. with stirring and slow nitrogen sparging. 100 g of Reaction Mixture A was added to the addition funnel and was then added to the stirring mixture over a period of 20 minutes. The temperature of the mixture remained about 65° C. during the entire addition.

The mixture in the flask began to thicken shortly after the addition of the Reaction Mixture A was begun. In this experiment, the MMA in the Reaction Mixture A had been washed with 10% aqueous sodium hydroxide solution to remove the inhibitor compound before the MMA was mixed with the BCP-1. A total of 195 g of additional distilled water was added in increments during the addition of the Reaction Mixture A to reduce the viscosity. After the addition of the Reaction Mixture A and the additional water was completed, the temperature of the contents of the flash was increased to 80° C., maintained at that temperature for one hour to complete the copolymerization reaction, and cooled to room temperature. The resulting aqueous emulsion contained a hydrophilic, water absorbing silicone-organic copolymer. It is believed that when the water-in-air contact angle of the dry elastomer obtained from the aqueous emulsion of this Example is measured that it will have a water-in-air contact angle of less than 80° C. at 25° C. and that the dry elastomer will absorb at least 3% by weight of water. It was observed that the emulsion obtained had a relatively large particle size.

EXAMPLE 4

The aqueous emulsion produced in Example 3 had a relatively large particle size. The glass transition temperature (measured by torsion braid analysis) of an elastomer produced by curing an organic peroxide catalyzed mixture having the same formulation as Reaction Mixture A was found to be −58° C. Because of this low glass transition temperature, it was thought that the emulsified elastomer particles were partially coalescing at the temperature used to manufacture that emulsion.

It was therefore decided to try a redox initiator system composed of a combination of ammonium persulfate and ferrous sulfate heptahydrate to accomplish the room temperature production of an aqueous emulsion of the present invention.

400 g distilled water, 17 g sodium lauryl sulfate (30% active) and 0.3 g ammonium persulfate were mixed together at room temperature in a flask as described in Example 3 with stirring and slow nitrogen sparging. When the mixture was well mixed 0.37 g of ferrous sulfate heptahydrate was added to the stirring mixture and allowed to dissolve. 100 g of Reaction Mixture A was slowly added to the rapidly stirring mixture over a period of 10 minutes. During the addition, the temperature of the contents rose from 20° C. to 30° C. and the viscosity of the mixture increased significantly at the end of the addition. It was also noted that the aqueous emulsion in the flask appeared to be thixotropic. 30 g of distilled water was added to the contents of the flask to reduce the viscosity after the addition of the Reaction Mixture A was completed.

The aqueous emulsion in the flask was allowed to stir without any additional heating. The calculated nonvolatile solids content of the emulsion was 19.3%. The nonvolatile solids content was monitored at the following intervals with the completion of the addition of the Reaction Mixture A being the starting point: 10 minutes—18.3% (94.8% conversion), 30 minutes—18.5% (95.9%), 60 minutes—18.6% (96.4%) and 120 minutes—18.7% (96.9%). The pH of the resulting aqueous emulsion was found to be 6.6. The emulsion obtained was very uniform and appeared to be translucent. The emulsion was orange in color, presumably due to the iron compounds present. The emulsion remained stable at room temperature for at least six weeks. The thixotropic emulsion obtained was applied to a piece of cheese cloth and a relatively transparent, flexible, continuous film was formed after coating was air dried. A similar product was obtained by drying a piece of cheese cloth coated with that emulsion in an oven at 100° C. for 15 minutes.

A piece of the cheese cloth supported membrane was placed in a vial filled with distilled water overnight. The film remained intact, did not dissolve in the water, and appeared to be swollen from absorption of water.

An elastomer film was prepared by coating the aqueous emulsion on a substrate and drying the coating. This film was placed in a vial of distilled water for 24 hours. The film remained intact and transparent. It is believed that when the water-in-air contact angle of the dry elastomer obtained from the aqueous emulsion of this Example is measured that it will have a water-in-air contact angle of less than 80° at 25° C. and that the dry elastomer will absorb at least 3% by weight of water.

EXAMPLES 5–7

In Example 5, Example 4 was repeated using an additional amount of water in the formulation initially. Thus, 500 g distilled water, 17 g sodium lauryl sulfate (30% active), 0.3 g ammonium persulfate and 0.37 g ferrous sulfate heptahydrate were mixed together at room temperature as in Example 4. 100 g of Reaction Mixture A was added to the vigorously stirring mixture over a period of 10 minutes. During the addition of the Reaction Mixture A, the temperature of the contents of the flask rose from 21° C. to 24° C. One half hour after the addition, the flask contents had reached a maximum temperature of 26.5° C. which then gradually decreased to room temperature since no external heating was applied. The contents of the flask was allowed to stir for a total of 90 minutes after the addition of the Reaction Mixture A was complete.

The calculated nonvolatile content of the aqueous emulsion of Example 5 was 17.1% and the measured nonvolatile content was 16.2% for a 94.6% conversion. Unlike Example 4, the viscosity of the contents of the flask remained low throughout the manufacture of the aqueous emulsion and the resulting aqueous emulsion was not thixotropic.

The emulsion of Example 5 was coated over cheese cloth and dried in an oven at 100° C. for 15 minutes. The resulting cheese cloth-supported film was continuous, flexible and transparent.

A 1/16 inch (1.6 mm) thickness of the emulsion of Example 5 was poured into an open dish to cast an unsupported membrane of the hydrophilic elastomer contained in the emulsion. A smooth, dry elastomer membrane was obtained when the emulsion was allowed to air dry and also when the dish was placed in an oven at 70° C. for 20 minutes. A ¼ inch (6.35 mm) thickness of aqueous emulsion resulted in a cracked membrane upon drying. Thinner thicknesses of emulsion tended to result in better membranes.

The aqueous emulsion of Example 5 was also coated on several substrates to evaluate the releasability of the elastomer films obtained upon drying the aqueous emulsion from the substrate. On a polystyrene substrate, the dry elastomer film adhered to the substrate and was hard to remove. The dry elastomer film was easy to remove from polyethylene coated paper, but the film of elastomer was hazy. The dry elastomer film was easy to remove from an aluminum foil substrate and the elastomer film was transparent.

Example 6 was a smaller sized batch (40% of the amounts used in Example 5) repeat of Example 5. Several physical properties of the emulsion and the particle size of the aqueous emulsion was measured The aqueous emulsion obtained was non-thixotropic, had a viscosity of 6.07 centistokes at room temperature and had a specific gravity of 1.022 at room temperature. The particle size of the latex was measured via transmission electron microscopy and were found to lie in the 0.10 to 0.23 micron range.

Example 7 was a repeat of Example 6 wherein the surfactant was omitted to determine whether or not the surfactant was necessary. Three separate additions of redox initiator [ammonium persulfate (0.12g) and ferrous sulfate hexahydrate (0.15 g)] were made: The initial amount was added before the addition of the Reaction Mixture A, a second amount equal to the first was made after the Reaction Mixture A addition was completed and a third, identical amount of redox initiator was added one hour after the addition of the Reaction Mixture A was complete. Some reaction appeared to take place after the third addition of redox initiator was made, but a large particle size polymer was obtained which precipitated out of the aqueous phase when the stirring was stopped. It therefore appears that a surfactant is necessary to produce an aqueous emulsion containing this type of elastomer.

That which is claimed is:

1. An aqueous emulsion containing a hydrophilic, water-absorbing, silicone-organic copolymer elastomer consisting essentially of the product obtained upon reacting (A) from 50 to 95 parts by weight of at least one block copolymer of the formula

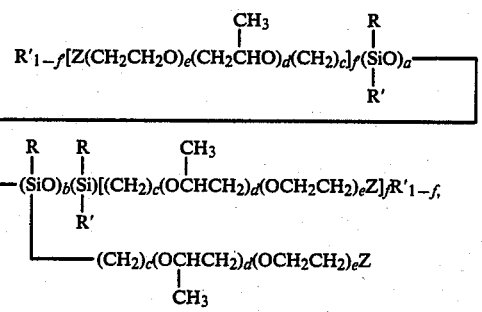

wherein
a is an integer of from 4 to 49, inclusive,
b is an integer of from 0 to 15, inclusive,
c is an integer having a value of from 2 to 4, inclusive,
d is an integer of from 0 to 25, inclusive,
e is an integer of from 5 to 50 inclusive
d+e is no greater than 50 and e is greater than or equal to d,
f is 0 or 1,
f' is 0 or 1,
f+f'+b is at least 2,
R is a monovalent hydrocarbon or halohydrocarbon radical of from 1 to 6 inclusive carbon atoms which is free of aliphatic unsaturation,
R' is a methyl or a phenyl radical,
Z is a monovalent radical selected from the group consisting of $CH_2=CR''COOR'''NHCOO-$, $CH_2=CHCH_2NHCOO-$ and $CH_2=CR''COO-$,
R'' is an alkyl radical of from 1 to 4 inclusive carbon atoms or hydrogen, and
R''' is a divalent hydrocarbon radical of from 1 to 6 inclusive carbon atoms with (B) from 5 to 50 parts by weight of at least one substantially water insoluble aliphatically unsaturated organic monomer which is compatible with said (A), said reaction being conducted under free radical polymerization conditions in the presence of water and an effective amount of a surfactant and wherein the dry elastomer obtained upon removal of the water is hydrophilic and capable of absorbing at least 3% by weight of water based upon the total weight of said elastomer.

2. The emulsion as claimed in claim 1 wherein said (B) is at least one monomer of the formula

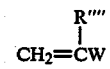

Wherein W is selected from the group consisting of $-COOR''''$, $-OOCCH_3$ and $-C_6H_5$ wherein R'''' is an alkyl radical of from 1 to 6 inclusive carbon atoms.

3. The emulsion as claimed in claim 2 wherein a is an integer of from 8 to 14, inclusive, c is 3 or 4, d is 0, e is an integer of from 10 to 20, inclusive, R is a methyl, phenyl or 3,3,3-trifluoropropyl radical, and Z is $CH_2=CR''COO(CH_2)_2NHCOO-$, and the surfactant is an anionic surfactant.

4. The emulsion as claimed in claim 3 wherein R and R' are each methyl radicals and wherein said composition contains from 30 to 50 parts by weight of said (B).

5. The emulsion as claimed in claim 3 wherein b is 0.

6. The emulsion as claimed in claim 5 wherein R and R' are each methyl radicals.

7. The emulsion as claimed in claim 3 wherein said emulsion contains from 30 to 50 parts by weight of said (B) and said (B) is selected from the group consisting of $CH_2=CCH_3COOCH_3$, $CH_2=CHC_6H_5$ and mixtures thereof.

8. The emulsion as claimed in claim 6 wherein said emulsion contains from 30 to 50 parts by weight of said (B) and said (B) is selected from the group consisting of $CH_2=CCH_3COOCH_3$, $CH_2=CHC_6H_5$ and mixtures thereof.

9. The emulsion as claimed in claim 1 which additionally contains dispersed within said emulsion at least one bioactive agent which is compatible with said emulsion.

10. The emulsion as claimed in claim 3 which additionally contains dispersed within said emulsion at least one bioactive agent which is compatible within said emulsion dispersion.

11. The emulsion as claimed in claim 4 which additionally contains dispersed within said emulsion at least one bioactive agent which is compatible with said emulsion.

12. The emulsion as claimed in claim 6 which additionally contains dispersed within said emulsion at least one bioactive agent which is compatible with said emulsion.

* * * * *